(12) United States Patent
Strelow et al.

(10) Patent No.: US 7,840,352 B2
(45) Date of Patent: Nov. 23, 2010

(54) METHOD AND SYSTEM FOR AUTONOMOUS VEHICLE NAVIGATION

(75) Inventors: Dennis W. Strelow, Sunnyvale, CA (US); Alan B. Touchberry, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 134 days.

(21) Appl. No.: 11/470,120

(22) Filed: Sep. 5, 2006

(65) Prior Publication Data

US 2008/0059068 A1  Mar. 6, 2008

(51) Int. Cl.
*G01C 21/00* (2006.01)
(52) U.S. Cl. .................... 701/214; 701/220; 701/213
(58) Field of Classification Search ............... 701/200, 701/213–215, 220, 207; 342/357.06, 357.09
See application file for complete search history.

(56) References Cited

U.S. PATENT DOCUMENTS

| | | | |
|---|---|---|---|
| 4,179,693 A | 12/1979 | Evans et al. | |
| 4,686,474 A | 8/1987 | Olsen | |
| 5,760,737 A | 6/1998 | Brenner | |
| 5,878,356 A | 3/1999 | Garrot, Jr. et al. | |
| 6,173,087 B1 | 1/2001 | Kumar | |
| 6,388,611 B1 | 5/2002 | Dillman | |
| 6,445,983 B1 | 9/2002 | Dickson et al. | |
| 6,928,194 B2 | 8/2005 | Mai et al. | |
| 7,127,348 B2 | 10/2006 | Smitherman et al. | |
| 7,143,130 B2 * | 11/2006 | Lin | 709/203 |
| 7,191,056 B2 | 3/2007 | Costello et al. | |
| 7,228,230 B2 * | 6/2007 | Hirokawa | 701/214 |
| 7,321,386 B2 | 1/2008 | Mittal | |
| 7,418,320 B1 | 8/2008 | Bodin | |
| 7,469,183 B2 | 12/2008 | Bodin | |
| 7,546,187 B2 | 6/2009 | Bodin | |
| 2003/0081827 A1 | 5/2003 | Paz-Pujalt | |
| 2004/0039497 A1 | 2/2004 | Wood | |
| 2005/0271300 A1 | 12/2005 | Pina | |

(Continued)

FOREIGN PATENT DOCUMENTS

WO  0104055  1/2001

(Continued)

OTHER PUBLICATIONS

Nister et al., "Visual Odometry", "Proceedings of the 2004 IEEE Computer Society Conference on Computer Vision and Pattern Recognition", Jun. 27, 2004, pp. 652-659, vol. 1, Publisher: CVPR, Published in: Washington D.C.

(Continued)

*Primary Examiner*—Yonel Beaulieu
(74) *Attorney, Agent, or Firm*—Fogg & Powers LLC

(57) ABSTRACT

A method and system are provided for autonomous vehicle navigation. In the method and system, one or more Global Positioning System (GPS) sensors, one or more inertial sensors, and one or more image sensors are provided on an autonomous vehicle. During operation of the autonomous vehicle, one or more GPS measurements, one or more inertial measurements, and one or more image measurements are obtained from the respective GPS sensors, inertial sensors, and image sensors. Each of the GPS measurements, inertial measurements, and image measurements are integrated together to estimate a position of the autonomous vehicle over time.

20 Claims, 1 Drawing Sheet

U.S. PATENT DOCUMENTS

| | | |
|---|---|---|
| 2006/0167596 A1 | 7/2006 | Bodin |
| 2006/0167622 A1 | 7/2006 | Bodin |
| 2008/0228335 A1 | 9/2008 | Bodin |
| 2008/0243372 A1 | 10/2008 | Bodin |

FOREIGN PATENT DOCUMENTS

| | | |
|---|---|---|
| WO | 2004070318 | 8/2004 |
| WO | 2005026662 | 3/2005 |

OTHER PUBLICATIONS

D. Strelow and S. Singh, "Online Motion Estimation from Image and Inertial Measurements", Workshop on Integration of Vision and Inertial Sensors (INERVIS 2003), Coimbra, Portugal, Jun. 2003,.

Dennis Strelow and Sanjiv Singh, "Reckless motion estimation from omnidirectional image and inertial measurements", IEEE Workshop on Omnidirectional Vision and Camera Networks (OMNIVIS 2003), Madison, WI, Jun. 2003.

* cited by examiner

METHOD AND SYSTEM FOR AUTONOMOUS VEHICLE NAVIGATION

BACKGROUND

Autonomous vehicle navigation is used in a variety of unmanned ground, underwater, and aerospace vehicles, such as robots and unmanned aerial vehicles. An autonomous vehicle is required to make decisions and respond to situations completely without human intervention. Navigation and control provide major limitations to the overall performance, accuracy, and robustness of an autonomous vehicle. In order to perform navigation properly, an autonomous vehicle must be able to sense its location, steer toward a desired destination, and avoid obstacles. An autonomous vehicle requires the integration of many sensors, actuators, and controllers to provide navigation and control.

Various modalities have been proposed or used to provide navigation of autonomous vehicles. These include use of the Global Positioning System (GPS), inertial measurements from sensors, and image measurements from cameras. The use of GPS, inertial, or image measurements alone are each problematic for autonomous vehicle navigation. For instance, the vehicle may not receive signals from enough GPS satellites to compute a unique position, or changes in the visible satellite configuration may cause large jumps in the estimated position. While the vehicle position can be estimated by integrating inertial measurements, these estimates accumulate large errors over time. Similarly, methods for computing vehicle positions from image measurements, such as shape-from-motion, also accumulate errors over time. These may include gross errors resulting from image matching errors or poor conditioning of the shape-from-motion estimation problem.

Some current autonomous vehicle navigation systems perform deep integration of GPS and navigation-grade inertial measurements for vehicle navigation. Other conventional navigation systems use deep integration of inertial measurements and image measurements for estimating the position of a vehicle or sensor rig over time. In other systems, navigation solutions are independently estimated from GPS, inertial, and/or image measurements, and then these estimates are merged into a single solution using an ad hoc method (not deep integration) such as averaging. These ad hoc systems typically use two of the three modalities.

SUMMARY

The present invention relates to a method and system for autonomous vehicle navigation. In the method and system, one or more Global Positioning System (GPS) sensors, one or more inertial sensors, and one or more image sensors are provided on an autonomous vehicle. During operation of the autonomous vehicle, one or more GPS measurements, one or more inertial measurements, and one or more image measurements are obtained from the respective GPS sensors, inertial sensors, and image sensors. Each of the GPS measurements, inertial measurements, and image measurements are integrated together to estimate a position of the autonomous vehicle over time.

BRIEF DESCRIPTION OF THE DRAWINGS

Features of the present invention will become apparent to those skilled in the art from the following description with reference to the drawing. Understanding that the drawing depicts only a typical embodiment of the invention and is therefore not to be considered limiting in scope, the invention will be described with additional specificity and detail through the use of the accompanying drawing, in which.

DETAILED DESCRIPTION

Figure 1:
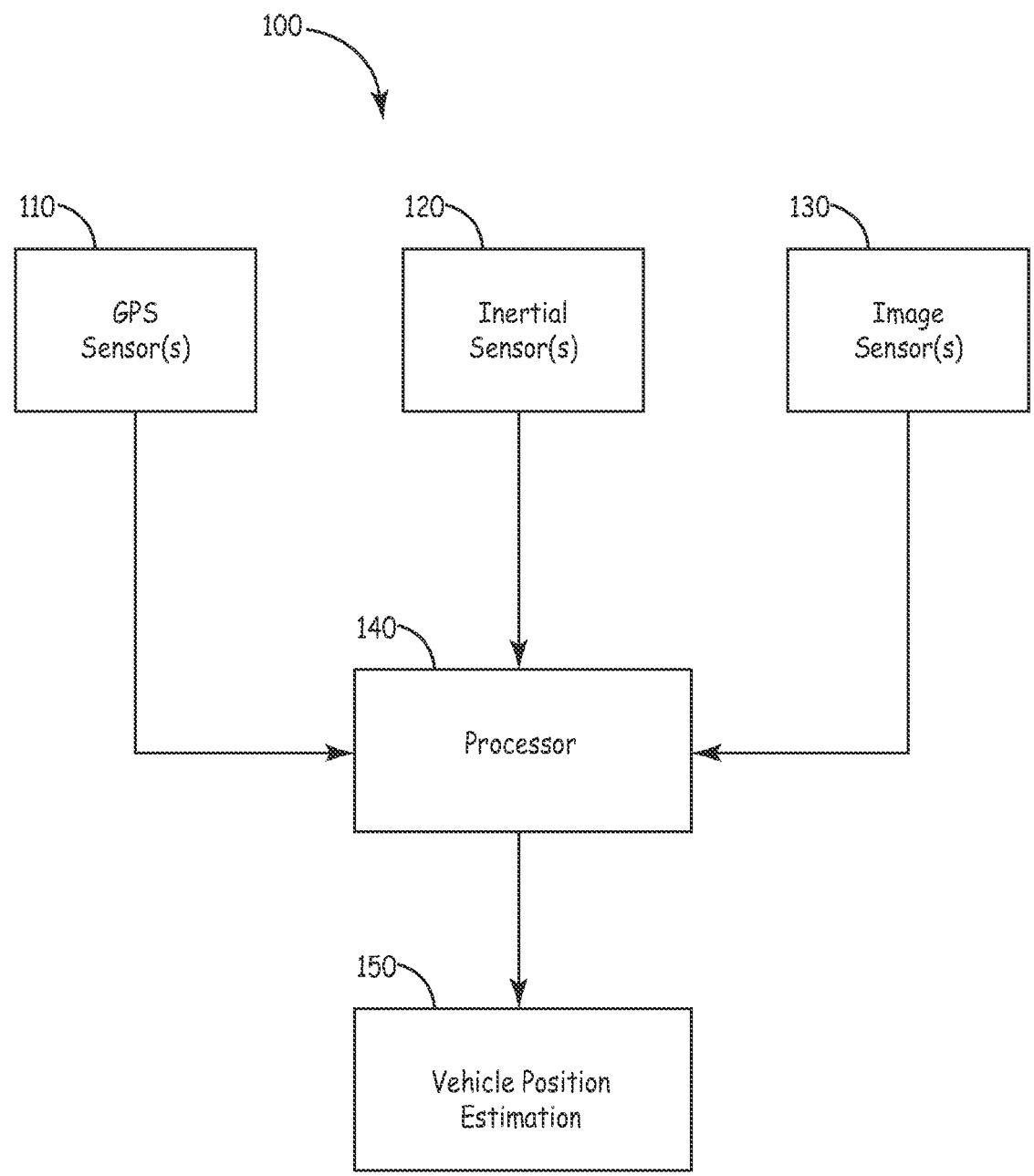
FIG. 1 is a schematic block diagram depicting a system for autonomous vehicle navigation according to one embodiment of the invention.

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention relates to a method and system for autonomous vehicle navigation that uses vehicle motion estimation. In the present method and system, one or more Global Positioning System (GPS) sensors, inertial sensors, and image sensors are provided on an autonomous vehicle. During operation, GPS measurements, inertial measurements, and image measurements are obtained from the sensors for the autonomous vehicle, and each of these measurements are integrated together to estimate a position of the autonomous vehicle over time.

FIG. 1 is a schematic block diagram depicting a system 100 for autonomous vehicle navigation according to one embodiment. The system 100 includes one or more Global Positioning System (GPS) sensors 110 operatively connected to an autonomous vehicle for obtaining GPS measurements. The system 100 also includes one or more inertial sensors 120 that are operatively connected to the autonomous vehicle for obtaining inertial measurements. For example, the inertial sensors 120 can include one or more accelerometers, gyroscopes, or combinations thereof. In addition, one or more image sensors 130 are operatively connected to the autonomous vehicle for obtaining image measurements. For example, the image sensors can include one or more cameras such as an omnidirectional camera. This camera combines a conventional camera with a convex mirror that multiplies the mirror's field of view, typically to 360 degrees in azimuth and about 90-140 degrees in elevation.

A data processor 140 receives measurement data from GPS sensor(s) 110, inertial sensor(s) 120, and image sensors(s) 130. The data processor 140 can be part of a general purpose or special purpose computer, or any programmable logic device. The data processor 140 has application software that provides program code means for integrating together each of the GPS measurements, inertial measurements, and image measurements. The result of this integration is a vehicle position estimation over time (block 150), which is output from data processor 140 for use by the navigation control of the vehicle.

The estimate of vehicle position can be determined from a batch estimation approach or a recursive estimation approach. In the batch estimation approach, all raw GPS, inertial, and image measurements are collected over a period of time and then a single position estimate is found that is most consistent with all of the measurements. In the recursive estimation approach (e.g., filtering), position estimates are computed during the vehicle's operation by incorporating only those measurements seen up to the current time. While batch estimation can provide more accuracy from the available measurements independent of the algorithm chosen, recursive estimation can be computed in real-time.

The present method can utilize deep integration of GPS, inertial, and image measurements, which increases the robustness of autonomous vehicle navigation. As used herein, "deep integration" means that an estimate of the vehicle's position over time is found that is simultaneously consistent with the raw measurements from the GPS sensors (e.g., pseudoranges), inertial sensors (e.g., angular velocities from gyroscopes, or linear accelerations from accelerometers), and image sensors (e.g., angles to objects observed in images).

As an example of the advantage of deep integration, it may be possible to compute accurate position estimates using deep integration in cases where independent estimates from GPS, inertial, or image measurements all contain gross errors and therefore cannot be usefully combined into a single accurate estimate.

The present method and system may be utilized where autonomous vehicle navigation occurs in a known environment or an unknown environment. When used in a known environment, image measurements of objects whose positions are previously known provide information about the absolute position of the vehicle without drift. When autonomous vehicle navigation occurs in an unknown environment, both the position of the vehicle over time and the structure of the environment are estimated. In this case, the present method is able to provide estimates without a priori information about the vehicle's surroundings, but image measurements provide only incremental information (like inertial sensors) rather than absolute information (like GPS sensors) about the vehicle's position.

Instructions for carrying out the various process tasks, calculations, and generation of signals and other data used in the operation of the systems and methods of the invention can be implemented in software, firmware, or other computer readable instructions. These instructions are typically stored on any appropriate computer readable media used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code means in the form of computer executable instructions or data structures. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented in computer readable instructions, such as program modules or applications, which are executed by a data processor. Generally, program modules or applications include routines, programs, objects, data components, data structures, algorithms, etc. that perform particular tasks or implement particular abstract data types. These represent examples of program code means for executing steps of the method disclosed herein. The particular sequence of such executable instructions or associated data structures represents examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for autonomous vehicle navigation, the method comprising:
    providing one or more Global Positioning System (GPS) sensors, one or more inertial sensors, and one or more image sensors on an autonomous vehicle;
    obtaining one or more GPS measurements, one or more inertial measurements, and one or more image measurements from the respective GPS sensors, inertial sensors, and image sensors during operation of the autonomous vehicle;
    integrating together each of the GPS measurements, inertial measurements, and image measurements; and
    estimating a position of the autonomous vehicle over time based on the integration.

2. The method of claim 1, wherein the inertial sensors comprise one or more gyroscopes, or one or more accelerometers.

3. The method of claim 1, wherein the image sensors comprise one or more cameras.

4. The method of claim 3, wherein the cameras comprise one or more omnidirectional cameras.

5. The method of claim 1, wherein the GPS measurements comprise one or more pseudoranges.

6. The method of claim 1, wherein the inertial measurements comprise one or more angular velocities, or one or more linear accelerations.

7. The method of claim 1, wherein the image measurements comprise one or more angles to objects observed in images.

8. The method of claim 1, wherein the estimate of the position of the autonomous vehicle is calculated from a batch estimation in which the GPS measurements, inertial measurements, and image measurements are collected over a period of time and then a single estimate is found that is most consistent with all of the measurements.

9. The method of claim 1, wherein the estimate of the position of the autonomous vehicle is calculated from a recursive estimation in which position estimates are computed during operation of the vehicle by incorporating only those measurements obtained up to a current time.

10. The method of claim 1, wherein when the autonomous vehicle navigation occurs in a known environment, image measurements of objects whose positions are known provide information about the absolute position of the vehicle without drift.

11. The method of claim 1, wherein when the autonomous vehicle navigation occurs in an unknown environment, both the position of the vehicle over time and structure of the environment are estimated.

12. The method of claim 11, wherein the image measurements provide incremental information about the position of the vehicle.

13. A system for autonomous vehicle navigation, comprising:

one or more Global Positioning System (GPS) sensors operatively connected to an autonomous vehicle for obtaining GPS measurements;
one or more inertial sensors operatively connected to the autonomous vehicle for obtaining inertial measurements;
one or more image sensors operatively connected to the autonomous vehicle for obtaining image measurements; and
a processor configured to execute program code for a method comprising:
  performing a deep integration of the GPS measurements, inertial measurements, and image measurements; and
  estimating a position of the autonomous vehicle over time based on the deep integration.

14. The system of claim 13, wherein the inertial sensors comprise one or more gyroscopes or accelerometers.

15. The system of claim 13, wherein the image sensors comprise one or more cameras.

16. The system of claim 15, wherein the cameras comprise one or more omnidirectional cameras.

17. The system of claim 13, wherein the GPS measurements comprise one or more pseudoranges.

18. The system of claim 13, wherein the inertial measurements comprise one or more angular velocities, or one or more linear accelerations.

19. The system of claim 13, wherein the image measurements comprise one or more angles to objects observed in images.

20. A computer readable medium having instructions stored thereon executable by a processor to implement a method for autonomous vehicle navigation, the method comprising:
  obtaining one or more GPS measurements, one or more inertial measurements, and one or more image measurements for an autonomous vehicle;
  performing a deep integration of the GPS measurements, inertial measurements, and image measurements; and
  estimating a position of the autonomous vehicle over time based on the deep integration.

* * * * *